United States Patent [19]
Black

[11] Patent Number: 5,910,776
[45] Date of Patent: Jun. 8, 1999

[54] METHOD AND APPARATUS FOR IDENTIFYING LOCATING OR MONITORING EQUIPMENT OR OTHER OBJECTS

[75] Inventor: Donald Black, Erie, Colo.

[73] Assignee: ID Technologies, Inc., Boulder, Colo.

[21] Appl. No.: 08/753,968

[22] Filed: Dec. 4, 1996

Related U.S. Application Data

[63] Continuation of application No. 08/327,560, Oct. 24, 1994, abandoned.

[51] Int. Cl.$^6$ ........................................... H04B 3/54
[52] U.S. Cl. ...................... 340/825.35; 340/310.06; 340/572; 340/825.54; 364/403; 307/140; 342/44
[58] Field of Search .................. 340/825.35, 825.52, 340/825.07, 825.54, 825.71, 825.72, 825.76, 686, 687, 537, 572, 310.01, 310.06, 310.08; 342/44, 50; 395/208, 228, 222

[56] References Cited

U.S. PATENT DOCUMENTS

| | | | |
|---|---|---|---|
| 4,036,178 | 7/1977 | Lee et al. | 119/51.02 |
| 4,301,445 | 11/1981 | Robinson | 340/825.54 |
| 4,429,299 | 1/1984 | Kabat et al. | 340/310.06 |
| 4,475,481 | 10/1984 | Carroll | 119/51.02 |
| 4,525,713 | 6/1985 | Barletta et al. | 340/825.54 |
| 4,656,463 | 4/1987 | Anders et al. | 340/521 |
| 4,673,932 | 6/1987 | Ekchian et al. | 340/825.35 X |
| 4,688,026 | 8/1987 | Scribner et al. | 340/572 |
| 4,798,175 | 1/1989 | Townsend et al. | 340/572 |
| 4,952,928 | 8/1990 | Carroll et al. | 340/725.54 |
| 5,053,774 | 10/1991 | Schuermann et al. | 342/44 |
| 5,095,309 | 3/1992 | Troyk et al. | 340/825.54 |
| 5,231,273 | 7/1993 | Caswell et al. | 340/825.54 X |
| 5,311,185 | 5/1994 | Hochstein et al. | 342/44 |
| 5,397,929 | 3/1995 | Hogarth et al. | 307/140 |
| 5,434,775 | 7/1995 | Sims et al. | 364/403 |

FOREIGN PATENT DOCUMENTS

| | | | |
|---|---|---|---|
| 596521 | 5/1994 | European Pat. Off. | 340/825.54 |

*Primary Examiner*—Michael Horabik
*Assistant Examiner*—William H. Wilson, Jr.
*Attorney, Agent, or Firm*—Patterson, Belknap, Web & Tyler LLP

[57] ABSTRACT

A method and apparatus for identifying, locating, and monitoring equipment or other objects is described wherein a radio frequency identification transponder (RFID) is housed on, around, or within a connector, such as an electrical plug used for powering electrical or electronic equipment. The transponder can then be automatically read by a RFID reader housed at a connector receptacle, such as within an electrical outlet, whenever the connector is attached same. The present invention allows an equipment tracking system to automatically identify, locate, and/or monitor equipment or other objects.

18 Claims, 5 Drawing Sheets

METHOD AND APPARATUS FOR IDENTIFYING LOCATING OR MONITORING EQUIPMENT OR OTHER OBJECTS

This application is a continuation of Ser. No. 08/327,560 filed Oct. 24, 1994, now abandoned.

BACKGROUND OF THE INVENTION

1. Field of the Invention

The present invention relates to the field of identifying, locating, and monitoring of equipment or other objects. More specifically, the present invention relates to a method and apparatus for automatically identifying, locating, and monitoring electrical and electronic equipment by use of radio frequency identification transponders and readers.

2. Brief Description of the Prior Art

Finding electrical and electronic equipment within a facility, such as an office or hospital, has generally been performed by "word of mouth." Obviously, the larger the area or the more buildings within a facility, the more difficult it becomes to identify and locate equipment. In a smaller office environment, identifying and locating equipment is merely a nuisance which affects productivity and causes frustration; in a larger office facility it can be more troublesome. Further, in certain facilities, for example, in a hospital environment, identifying and locating equipment can mean the difference between life and death.

Several solutions to the problem of identifying and locating electrical and electronic equipment have been tried with limited success. For example, simple inventory control and sign-out sheets have been found to be labor intensive, inaccurate and, as a result, ineffective for identifying and locating equipment. Further, sign-out sheets do not allow for monitoring equipment, for example, determining if a piece of equipment is drawing power, whether the piece of equipment is functioning properly or needs maintenance, and the like In another example, bar codes have been used. As shown in FIG. 1, bar coding of equipment a allows one to identify and locate the equipment by scanning the bar code with a portable bar code scanner b. However, bar coding becomes ineffective when the equipment has been moved since it was last scanned. Moreover, the use of bar codes can require the labor-intensive step of touring the facility with one or more portable scanners b. Further, bar codes do not allow for monitoring of the equipment as discussed above.

In another example, radio frequency identification (RFID) can be used by attaching a RFID transponder to the equipment to be identified and located. However, this method is only effective if one is willing to go to the effort of placing the equipment within the "read range" of a corresponding RFID reader. This often will not happen. Consequently, the unit to be located is essentially "lost" if located at a substantial distance from the last point that the RFID transponder was read. Moreover, the vast differences in equipment shape and size can make it difficult to expose the RFID transponder to the corresponding reader for identification. Finally, unless the transponder is continuously within the read range of the reader, monitoring of the equipment as discussed above is either difficult or not possible.

Accordingly, its an object of the present invention to provide a method and apparatus for identifying, locating and/or monitoring equipment or other objects.

It is another object of the present invention to provide a method and apparatus for identifying, locating and/or monitoring equipment or other objects by using transponders and readers.

It is another object of the present invention to provide a method and apparatus for identifying, locating and/or monitoring equipment or other objects by using radio frequency identification transponders and readers.

It is another object of the present invention to provide a method and apparatus for identifying, locating, and/or monitoring equipment or other objects by using radio frequency transponders in a way that will assure that the transponder is automatically and consistently in the read range of a radio frequency reader.

SUMMARY OF THE INVENTION

The above and other objects are met by the present invention for a method and apparatus for identifying, locating, and/or monitoring equipment or other objects, particularly electrical or electronic equipment having electrical plug-type connectors. Specifically, by placing a radio frequency transponder on, around, or within a connector for a piece of equipment and placing a corresponding radio frequency reader on, around, or within a connector receptacle, automatic, and consistent reading of the transponder is achieved. As a result, the associated equipment can be easily, consistently, and automatically identified, located, and monitored. For purposes of the following discussion, the connector and receptacle are usually referred to as an electrical power plug and outlet, respectively. As will become readily apparent to those skilled in the art, the same apparatus and methodology may be applied in any situation where an object has complementary connector/receptacles, e.g., the connector/receptacle could be a hose/bib, key/lock, telephone plug/jack, connectors and receptacles used in computer systems, or any other type of connector and receptacle.

BRIEF DESCRIPTION OF THE DRAWINGS

The novel features of the present invention are set forth in the appending claims. The invention itself, however, as well as its objects and advantages, will be best understood by reference to the following detailed description of preferred embodiments of the invention when made in conjunction with the accompanying drawings, wherein:

DETAILED DESCRIPTION OF PREFERRED EMBODIMENTS

As described in D. Black, "A Short Course In RFID Technologies," *ID Systems* p. 52 (February 94), one of the easiest, most flexible ways of tracking equipment is by use of radio frequency identification (RFID). These wireless systems are designed to work in all manufacturing and service industries, even in the most hostile environments. RFID can provide an integrated system of identification and tracking. No direct contact is needed between the reader and the transponder (RFID tag). Contrary to bar codes, to exchange information a transponder does not have to be placed in line-of-sight or on an exposed area of packaging, or on labels where they could be damaged. Further, a RFID transponder can be placed inside an item that is to be tracked, so long as the transponder can be situated near a RFID reader. Transponders can carry product information, specific instructions, and other data for automated operations, which can be changed or updated.

RPID transponders are divided into two major groups: read-write and read-only. The read-write devices contain alterable memory (e.g., an EPROM) which allows the user to modify stored data during the course of normal use, even when the power is removed from the device. Read-only devices are programmed with a unique set of data that cannot be modified.

Further, transponders may be either active or passive. An active transponder receives its operating power from a battery connected to, or built into, the transponder. The battery may be rechargeable. These systems have the advantage of reducing power requirements from the reader, and they generally have a longer read range. On the negative side, they have a limited life, limited operating environments, and are more expensive than passive devices. Conversely, a passive transponder operates without a separate external power source.

Figure 1:
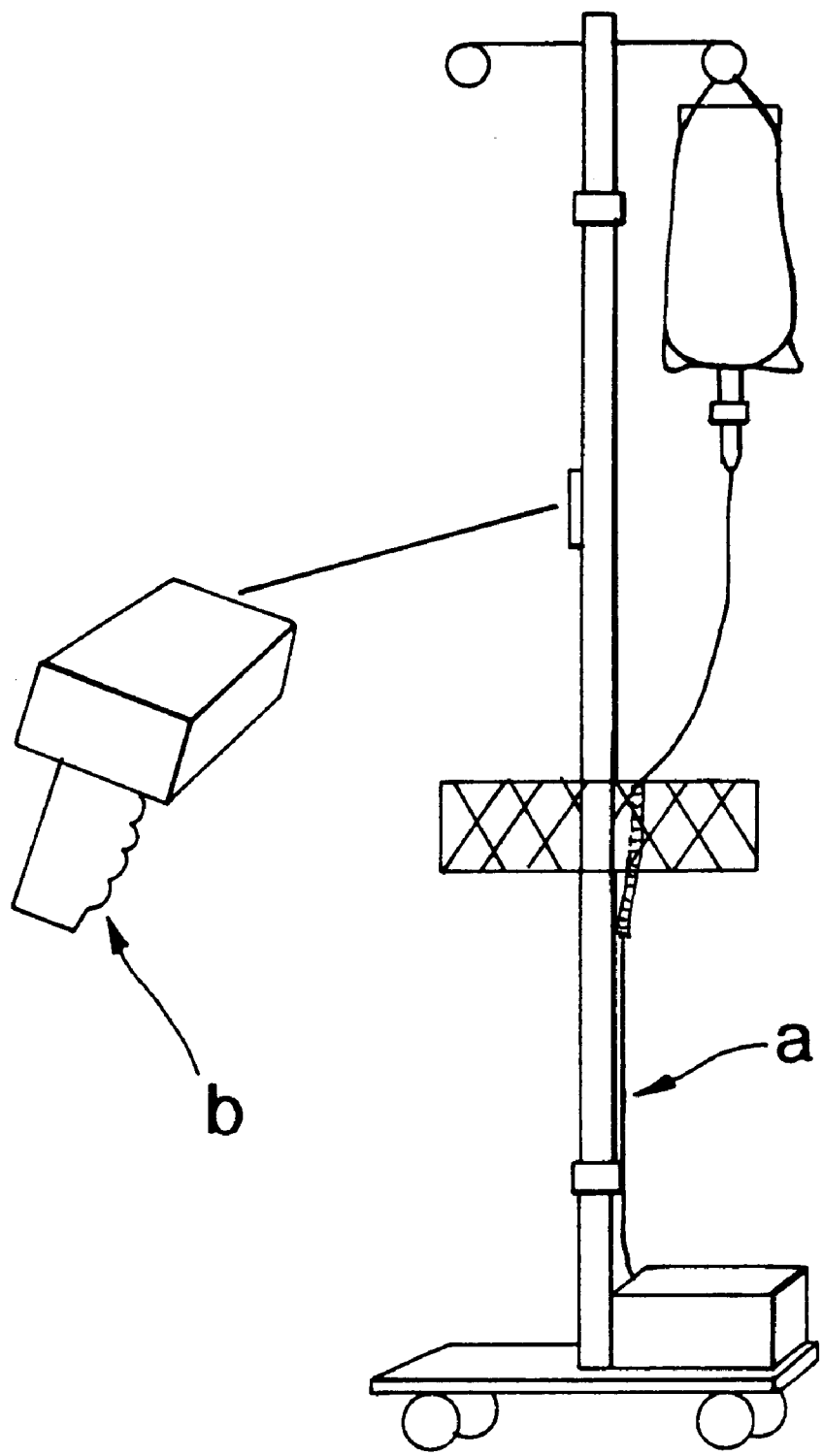
FIG. 1 is a pictorial view of a prior art method and apparatus for identifying a piece of equipment using bar codes and a hand held scanner.
Figure 2:
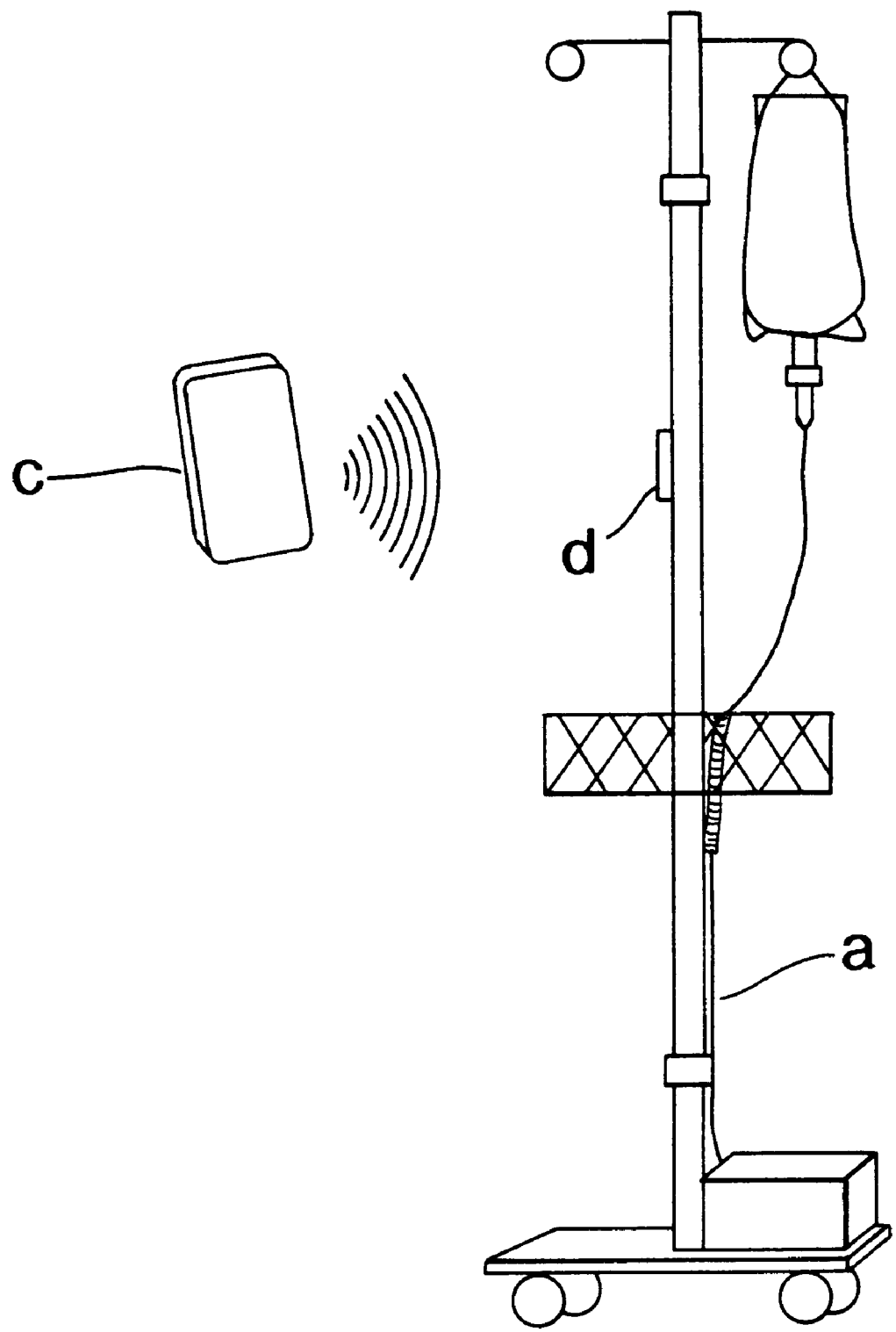
FIG. 2 is a pictorial view of a prior art method and apparatus for identifying a piece of equipment using a radio frequency identification tag attached to the equipment and a reader which may be fixed or movable.

FIG. 2 is a drawing of a prior art method and apparatus for identifying and locating electronic equipment a utilizing a system having a radio frequency identification transponder d mounted on the equipment and a reader c that can either be handheld or mounted. This method has associated problems related to human compliance in reading the RFID tag (transponder), placement of the RFID tag in a location that is easily accessible, finding the location of the RFID tag on the equipment, and mounting the tag such that it is unaffected by the proximity to certain interfering materials or electrical fields. Further, this method and apparatus has the same problem as bar code technology, that is, one can only record the location of equipment when the RFID tag was last read. Subsequent moving of the equipment without rereading the RFID tag means that the equipment is effectively "lost" to the system. Further, unless the transponder is continuously within the read range of the reader monitoring of the equipment is either difficult or not possible.

The present invention solves the prior problems associated with using RFID transponders and readers for identifying, locating, and/or monitoring equipment or other objects. Specifically, by placing a RFID transponder within an equipment's connector and a RFID reader within a corresponding receptacle, automatic and consistent identifying, locating, and monitoring of equipment is achieved.

Figure 3:
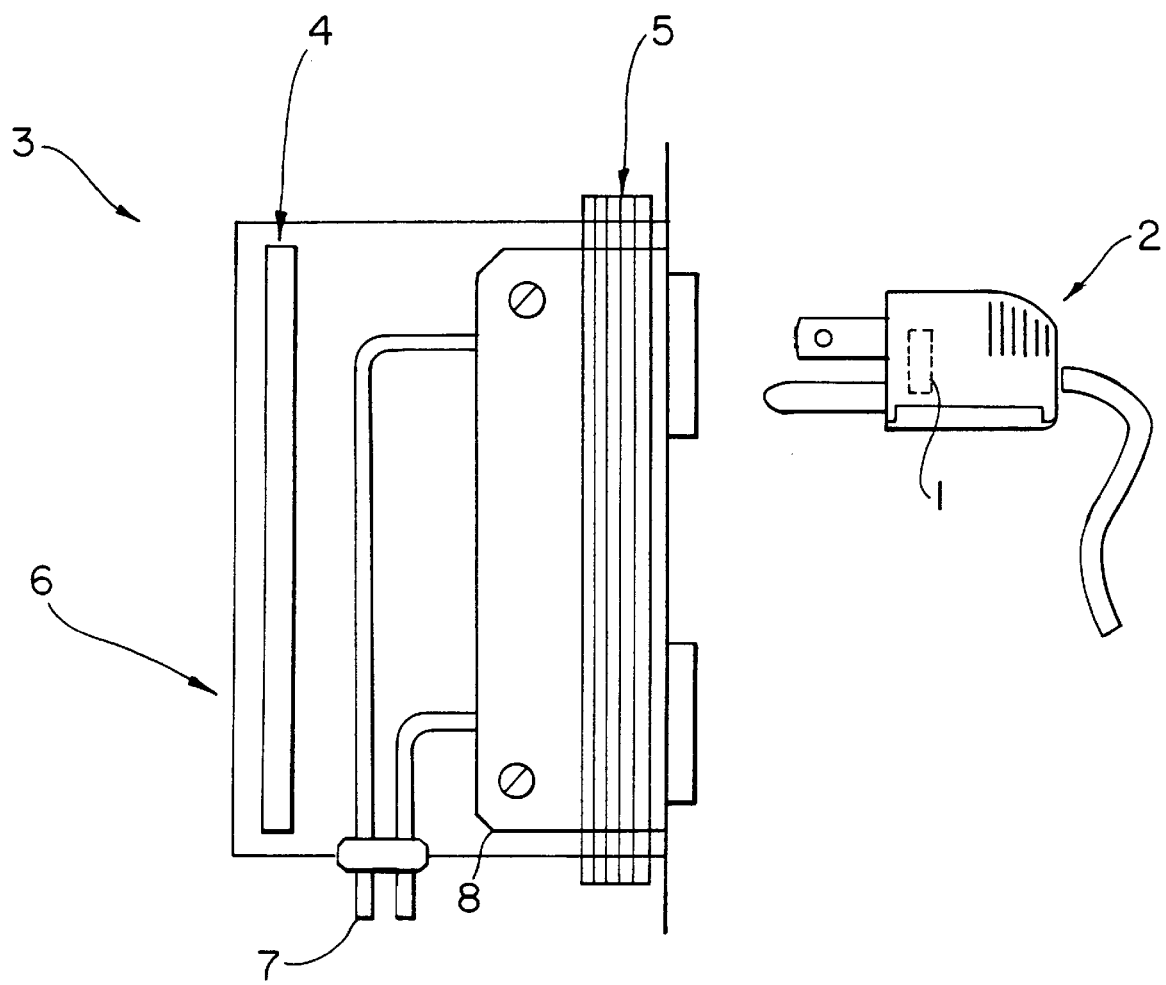
FIG. 3 is a side view of an embodiment of the present invention wherein the radio frequency identification transponder is located within a connector, specifically a power plug, for a corresponding piece of electronic or electrical equipment (not shown) and the radio frequency reader is located in the connector receptacle, specifically an electrical outlet.

FIG. 3 is a side view of an embodiment of the present invention wherein the radio frequency transponder 1 is in an electric plug and the reader 3 is in an electric outlet. As shown, the radio frequency transponder 1 may be placed in or on an existing power plug 2, or it may be manufactured as an integral unit of a power plug. In either event, such a configuration allows the reader 3 to interrogate the transponder automatically and consistently whenever the plug is placed near or in the receptacle. By placing the transponder and reader within a plug and receptacle, respectively, the present invention assures that the transponder is brought to within the read range of the reader. An equipment tracking system can then be used to maintain a database of information on where each piece of equipment is located. Specifically, the readers may actively or passively feed information concerning the equipment to either central or remote tracking systems via the existing electrical wiring or via other networks or systems capable of carrying such information. In the particular embodiment shown in FIG. 3, the reader 3 is comprised of electronics board 4 and an antenna 5 all housed within the wall outlet housing 6. The existing electrical wiring 7 and outlet 8 are also shown.

As will become readily apparent to those skilled in the art, the readers may also optionally serve to monitor and/or adjust the electrical flow of current through the connectors based upon readings from the connector when the plug is connected to same or from the transponder. Such an implementation precludes human participation, and gives a continuous readout of the location of identified pieces of equipment while they are plugged-in. Monitoring equipment information can also include the time that the equipment was connected to power outlet and the time that the equipment was removed. Further, extensions of this invention can be made to include RFIDs which directly or indirectly monitor the amount of time that the equipment has been used, whether the equipment is functioning properly, and/or when the equipment was used. Such information also is invaluable in determining calibration and maintenance schedules. If appropriate, the presence or absence of a transponder may also be used to activate certain recording information or annunciators. Further, as will also become apparent to those skilled in the art, the monitored information or other information can be stored locally in a transponder having a read/write memory.

Figure 4:
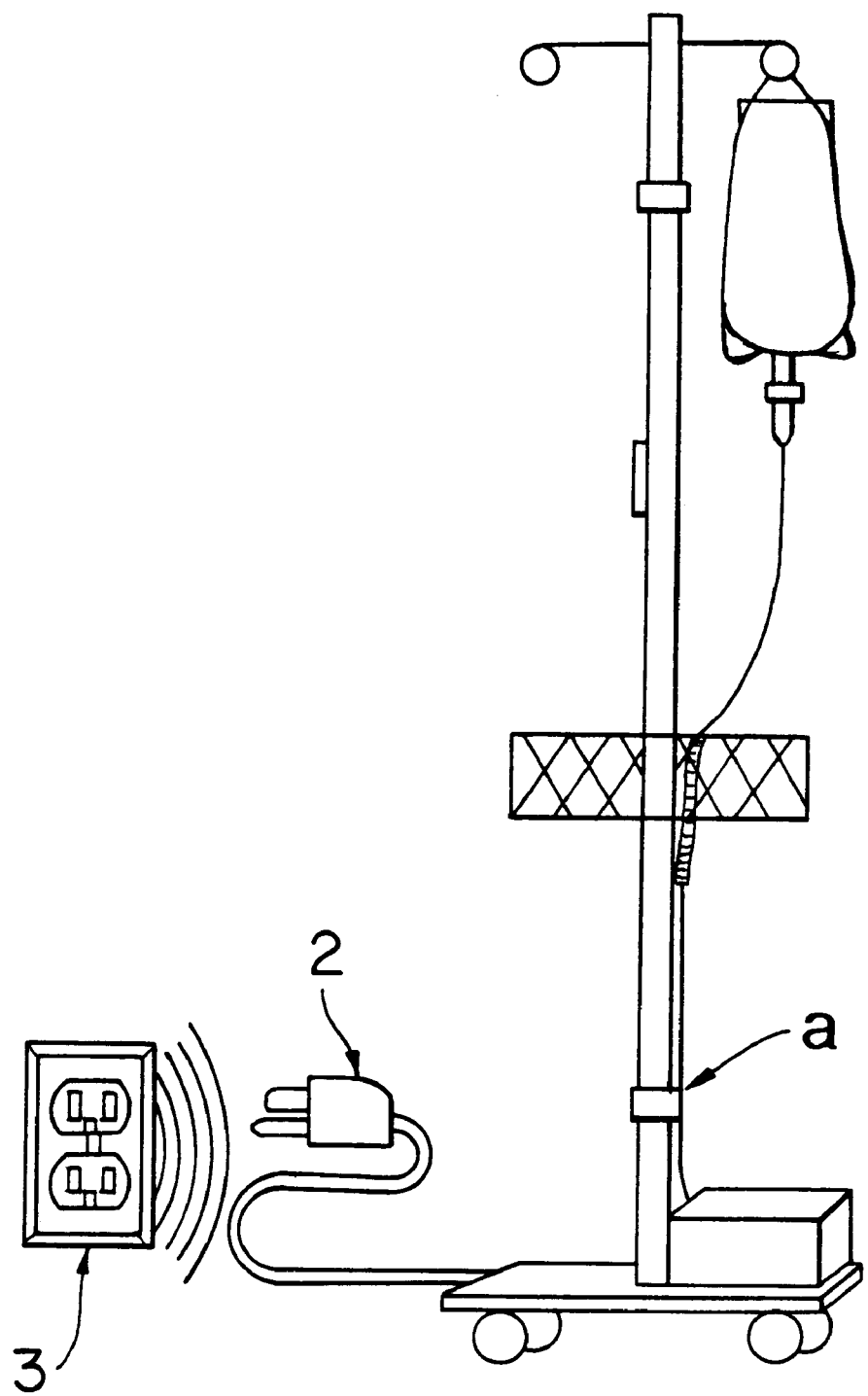
FIG. 4 is a pictorial view of an embodiment of the present invention implemented on a piece of hospital equipment, specifically an IV pump, and the placement of the radio frequency identification reader at a power outlet.

FIG. 4 is a pictorial drawing depicting an embodiment of FIG. 3 with the power plug 2 connected to a piece of electrical equipment a, here, an electric IV pump, and the corresponding reader 3 implemented in an outlet.

Figure 5:
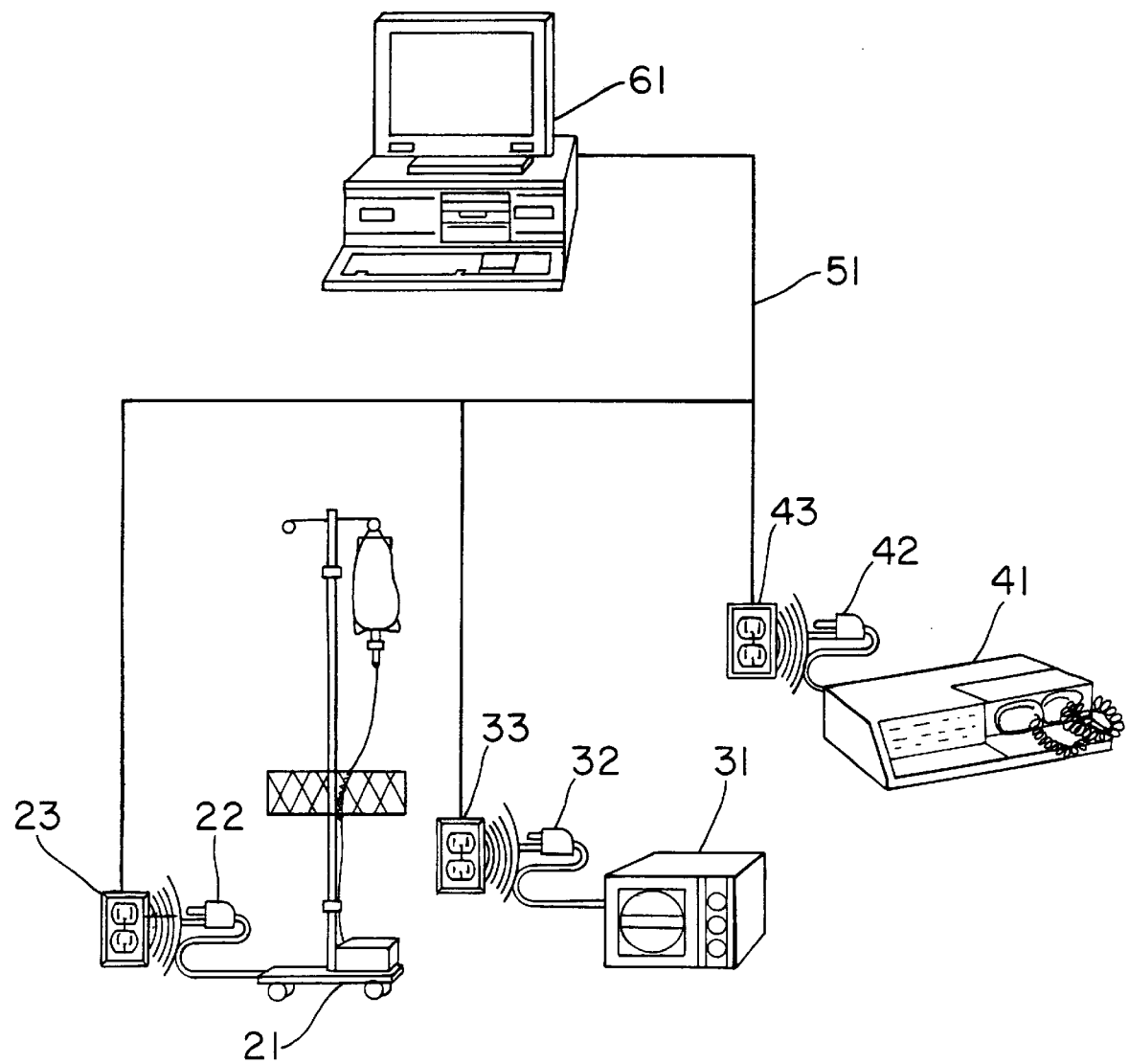
FIG. 5 is a pictorial view of an embodiment of the present invention wherein various pieces of equipment incorporating radio frequency transponders in their plugs are used in a network of outlets having radio frequency readers.

FIG. 5 is a drawing depicting multiple transponders and readers in a working environment where they provide information to a centralized tracking system. As shown, various pieces of electronic equipment, for example an electrical IV pump 21 and electronic monitors 31 and 41 each have incorporated within their respective plugs, 22, 32, and 42, a radio frequency transponder. Correspondingly, each electrical outlet 23, 33, and 43 has imbedded therein a radio frequency reader to interrogate any plug used within the outlet. Each reader is thereby connected through an information network 51. The network is then connected to a computer tracking system 61 or the like for identifying, locating, and/or monitoring each piece of equipment. As will become readily apparent to those skilld in the art, the information network 51 can be incorporated in the existing electrical wiring for each of the outlets 23, 33, and 43 or, alternatively, the information network can be wired separately to each outlet thereby bypassing the existing electrical wiring. Further, as will become readily apparent to those skilled in the art, each piece of electronic equipment is not limited to a specific outlet but may be used on any outlet having a reader. For example, the electrical IV pump 21 can be moved to a different location within a facility and plugged into another outlet, for example outlet 43. The reader imbedded within the outlet 43 will then interrogate the corresponding transponder 22 of the IV pump and pass equipment information through the information network 51 to the tracking system 61. The tracking system 61 will then be able to identify the piece of electronic equipment as being the electrical IV pump 21 and note that its moved to a new location at outlet 43.

Further, as will readily become apparent to those skilled in the art, the present invention is not limited to electrical plug/outlet combinations and be applied in any situation where complimentary connector/receptacles must be mated to be operable, e.g., a hose/bib, a key/lock, telephone plug/jack, connectors and receptacles used in computer systems, or other types of connector and receptacle combinations.

Although the present invention has been described with reference to specific embodiments, various modifications as well as other embodiments of the invention will become apparent to those skilled in the art. It is therefore contemplated that the appended claims will not be construed in the limiting sense and will cover any such modification or embodiments as fall within the true scope of the invention.

What is claimed is:

1. A method for identifying, locating, and/or monitoring an object having a connector which can be connected to a receptacle for at least one reason other than identifying locating and/or monitoring the object comprising the steps of:
    a) attaching a transponder to the connector;
    b) attaching a non-contact reader having a reading range to the receptacle;
    c) reading information from the transponder with the reader when the transponder is in the reading range;
    d) using the information read from the reader to identify, locate, and/or monitor the object.

2. A method according to claim 1 wherein the transponder is a radio frequency transponder and the non-contact reader is a radio frequency reader.

3. A method according to claim 2 wherein said reading step includes the step of reading identification information of the object and said using step includes the step of transmitting the information through an information network to a computer tracking system and comparing the identification information to a database of objects stored at the computer tacking system to determine the identity of the object.

4. A method according to claim 3 wherein said locating step includes the step of compiling a database of the location of the reader and comparing the identification information to the reader to determine the location of the object.

5. A method according to claim 3 wherein said reading step includes the step of reading monitoring information and said monitoring step includes the step of monitoring the monitoring information.

6. A method according to claim 5 wherein the monitoring information includes the time when the reading step starts being performed.

7. A method according to claim 6 wherein the monitoring information further includes the time when the reading step stops being performed.

8. An apparatus for identifying an object having a connector which can be connected to a receptacle for at least one reason other than identifying the object comprising:
    a) a transponder attached to the connector; and
    b) a non-contact reader having a read range attached to the receptacle so that when the connector is within the read range the reader can read object information from the transponder.

9. An apparatus according to claim 8 wherein the transponder is a radio frequency transponder and the non-contact reader is a radio frequency reader.

10. An apparatus according to claim 9 wherein the object is a piece of electrical equipment.

11. An apparatus according to claim 10 wherein the connector is an electrical plug.

12. An apparatus according to claim 11 wherein the receptacle is an electrical outlet.

13. An apparatus according to claim 8 further comprising an object information database stored at a computer tracking station and an information network for distributing the object information to or from the object information database from or to the non-contact reader.

14. An apparatus according to claim 13 wherein said object information database includes object identification information.

15. An apparatus according to claim 14 wherein said object information database includes object location information.

16. An apparatus according to claim 14 wherein said object information database includes object monitoring information.

17. An apparatus according to claim 16 wherein said monitoring information includes information on the power consumption of said object.

18. An apparatus for identifying a piece of electrical equipment having a plug which can connect to an electrical outlet comprising:
    a) a radio frequency transponder attached to the plug, said transponder having equipment identification information;
    b) a radio frequency reader having a read range so that when said transponder is within said read range said reader can read said equipment identification information and wherein said transponder is within said read range when said plug is plugged into said electrical outlet;
    c) an information network for distributing information from at least one radio frequency reader including said reader to a central location; and
    d) an information database for storing information received at said central location, said database including equipment identification and said equipment location.

* * * * *

UNITED STATES PATENT AND TRADEMARK OFFICE
CERTIFICATE OF CORRECTION

PATENT NO. : 5,910,776
DATED : June 8, 1999
INVENTOR(S) : Donald Black

It is certified that error appears in the above-indentified patent and that said Letters Patent is hereby corrected as shown below:

Column 1, line 38, after the word like insert --.--.

Column 3, line 16, replace "RPID" with --RFID--.

Column 5, line 43, replace "tacking" with --tracking--.

Column 5, line 50, replace "step" with --steps--.

Signed and Sealed this

Twenty-third Day of November, 1999

*Attest:*

Q. TODD DICKINSON

*Attesting Officer*  Acting Commissioner of Patents and Trademarks